April 6, 1943.  J. E. ANDERSON  2,315,574
PROPELLER BLADE MOUNTING
Filed March 9, 1940
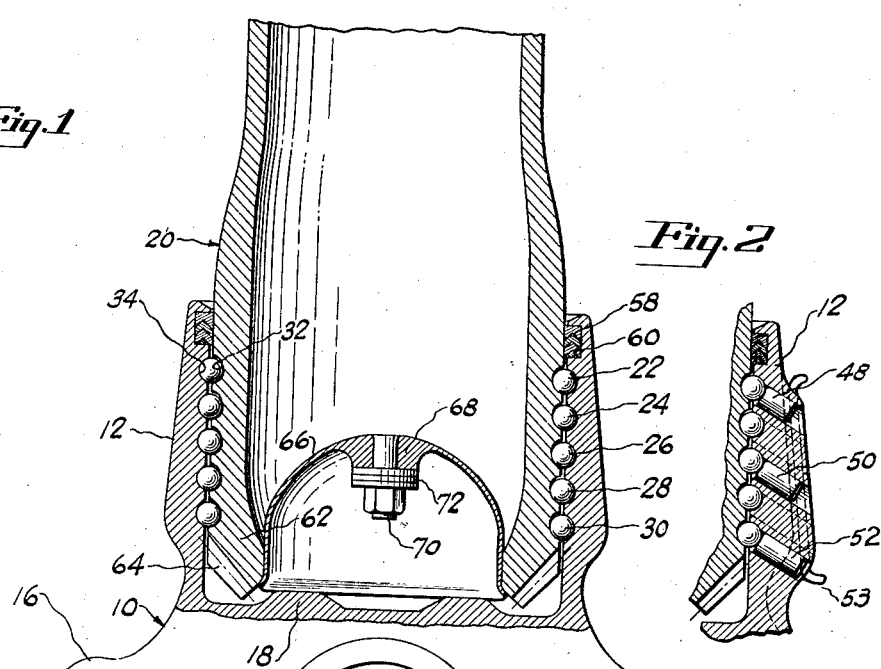
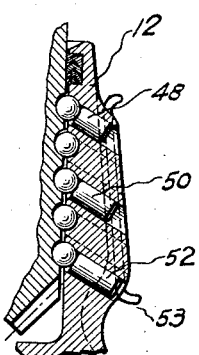
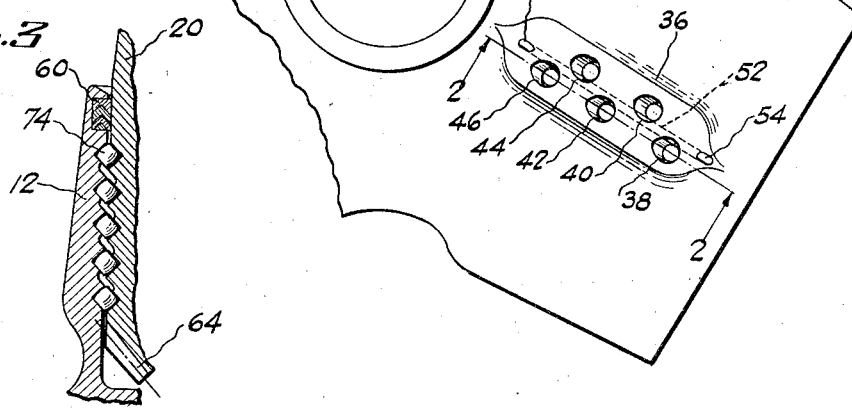
INVENTOR
John E. Anderson
BY
Harris G. Luther
ATTORNEY Patented Apr. 6, 1943

2,315,574

UNITED STATES PATENT OFFICE 2,315,574

PROPELLER BLADE MOUNTING

John E. Anderson, Portland, Conn., assignor to United Aircraft Corporation, East Hartford, Conn., a corporation of Delaware Application March 9, 1940, Serial No. 323,054

4 Claims. (Cl. 170—162)

This invention relates to improvements in anti-friction propeller blade mounting bearings and has particular reference to an improved bearing construction for rotatably securing a metal blade shank in a metal propeller hub.

An object of the invention resides in the provision of an improved blade mounting bearing of the character indicated in which the bearing races are formed in the hub and blade structure and separate races for the bearings are eliminated.

A further object resides in the provision of an improved propeller blade mounting bearing of the character including means for assembling the anti-friction elements into the bearing and retaining them in operative position.

A still further object resides in the provision of an improved propeller blade having a metal shank portion with the blade mounting bearing races and the blade turning gear formed integrally therewith.

Other objects and advantages will be more particularly pointed out hereinafter or will become apparent as the description proceeds.

In the accompanying drawing, in which like reference numerals are used to designate similar parts throughout, there is illustrated a suitable mechanical embodiment for the purpose of disclosing the invention. The drawing, however, is for purposes of illustration only and is not to be taken as limiting the invention since it will be apparent to those skilled in the art that various changes in the illustrated construction may be resorted to without in any way exceeding the scope of the invention.

In the drawing, Fig. 1 is an end elevational view of a propeller hub, a portion thereof and a portion of an associated propeller blade being shown in section to better illustrate the construction of the blade and blade mounting bearing.

Fig. 2 is a sectional view of a fragmentary portion of the improved propeller blade and hub structure taken on the line 2—2 of Fig. 1, and Fig. 3 is a sectional view of a fragmentary portion of the blade mounting showing the application thereto of a different type of anti-friction element from those shown in Figs. 1 and 2.

Referring to the drawing in detail, the numeral 10 generally indicates a unitary metal propeller hub having three cylindrical blade retaining sockets 12, 14 and 16 for receiving the blades of a three-bladed propeller. It is obvious, of course, that the invention is in no way limited to a three-bladed propeller construction since it may be applied with equal facility to a propeller having one, two or four or more blades.

Each blade socket has a closed inner end provided by an integral transverse partition, as indicated at 18, and has a cylindrical portion which closely surrounds the included portion of the shank end of the blade. The blades, one of which is generally indicated at 20, are secured in the respective sockets by parallel rows of anti-friction elements as indicated at 22, 24, 26, 28 and 30. While five rows of anti-friction elements have been illustrated in the accompanying drawing it is to be understood that the invention is not limited to any particular number of such rows of anti-friction elements as this number may be varied for various propeller types and sizes so long as the bearing is adequate to carry the centrifugal and bending loads imposed thereon by the propeller blades during operation of the propeller.

In the construction illustrated in Figs. 1 and 2, the various rows of anti-friction elements are each made up of a plurality of ball elements disposed in registering opposed grooves provided directly in the blade shank and in the interior surface of the blade receiving socket. For each bearing ring a substantially semi-circular groove, as indicated at 32, is provided in the exterior surface of the socket included portion of the shank, and a similar registering groove, as indicated at 34, is provided directly in the interior surface of the shank receiving portion of the blade supporting socket. Both the socket and the blade shank are preferably heat treated to provide hardened bearing surfaces for the anti-friction ball elements and the invention is particularly applicable to constructions utilizing steel hub structures and steel propeller blades since the steel can be machined and ground to provide accurate ball grooves and can then be heat treated to harden the wearing surfaces. A localized heat treatment of these wearing surfaces may be applied by some conventional means such as electric induction heating or flame hardening.

In the arrangement shown in Fig. 3 roller elements are used, disposed in registering grooves of angular cross section in the blade shank and hub, but otherwise the construction may be the same as for the ball elements shown in Figs. 1 and 2.

Each socket is provided on one side thereof with a thickened portion or boss 36, through which holes or apertures, as indicated at 38, 40, 42, 44 and 46 are drilled leading to the inner edges of the socket grooves, as particularly shown in Fig. 2. After the blade has been inserted in the socket 12 and positioned to bring the corresponding grooves into registry, the ball elements are inserted through the respective holes in the boss member until the rings of bearing elements are completely filled. As at least one of the grooves is elongated as shown in Figs. 1 and 2, the blade may then be moved slightly outwardly, as by adjusting the pitch changing gears, to bring the balls into contact with the bearing surfaces of the corresponding grooves and out of registry with the holes. Plugs, as indicated at 48, 50 and 52 are then inserted in the holes to provide lubricant seals and prevent foreign matter from getting into the bearings. The plugs may be secured in the holes by suitable means, such for example as the rod member 53 which passes through a longitudinal aperture in the boss member and over the beveled ends of the plugs, or by screw threads or other suitable means. The rod member may be secured in place by bending up its end portions as indicated at 54 and 56.

Near its outer end the socket is provided with an annular internal groove 58 of rectangular cross section within which there is disposed a resilient packing 60, which may be of a resilient type, to provide a lubricant seal between the blade shank and the associates socket.

The inner end of the blade shank may be thickened, as indicated at 62 and this thickened portion may be provided with beveled gear teeth 64 adapted to mesh with a pitch changing gear, not illustrated, to oscillate or rotate the propeller blade about its longitudinal axis and control the pitch thereof and also hold the blade in position to slightly preload the retaining bearing, as stated above. This pitch changing gear may project through a slot, not illustrated, in the bottom of each socket to mesh with the teeth 64 of the respective propeller blade ends and lubricant may flow to the blade bearings through the slots provided for this gear. Other or different means for lubricating the bearing may, however, be provided if desired.

The shank end of the propeller blade may be closed by a suitable metal plug or cap member, as indicated at 66, which member may be provided with a seat 68 to support a bolt 70 carrying blade balancing weights 72. This plug or cap member should have a fluid tight connection with the propeller blade end and may be secured to the blade end in some suitable manner such as by welding, brazing or by expanding it into the blade end portion in a fluid sealing manner. The purpose of the plug or cap 66, besides supporting the weight 72, is to prevent the hollow interior of the propeller blade from filling with lubricant supplied to the blade supporting bearings and pitch changing gear elements.

While an integral blade and shank portion have been illustrated and hereinabove described, it is to be understood that the invention may be applied with equal facility to a composite blade having a hard metal shank or ferrule and a blade portion formed of a different material such as wood, laminated wood or aluminum.

While a suitable mechanical construction has been illustrated in the accompanying drawing and hereinabove described for the purpose of disclosing the invention, it is to be understood that the invention is not limited to the construction so illustrated and described, but that such changes in the size, shape and arrangements of the various parts may be resorted to as come within the scope of the sub-joined claims.

Having now described the invention so that others skilled in the art may clearly understand the same, what it is desired to secure by Letters Patent is as follows:

1. In a propeller blade mounting including a blade shank and a shank receiving hub socket, a set of substantially parallel grooves in the socket included portion of said blade, a set of substantially parallel grooves in said socket, one set of grooves having an elongated cross-sectional shape, and a plurality of apertures in said socket one for each groove therein, each aperture extending from the bottom portion of the respective groove with its center line oblique to the plane of said respective groove.

2. In a propeller blade mounting including a blade shank and a shank receiving hub socket, a set of substantially parallel grooves in the socket included portion of said blade, a set of substantially parallel grooves in said socket, one set of grooves having an elongated cross-sectional shape, and a plurality of apertures in said socket one for each groove therein, each aperture extending from the bottom portion of the respective groove and having its centerline in a plane intersecting the plane of the respective groove, said first-mentioned plane including a radius of said respective groove, which radius extends from the axis of said blade shank to said respective groove, said centerline intersecting said radius at an acute angle.

3. In a propeller blade mounting including a blade shank and a shank receiving hub socket, a set of substantially parallel grooves in the socket included portion of said blade, a set of substantially parallel grooves in said socket, one set of grooves having an elongated cross-sectional shape, and a plurality of apertures in said socket one for each groove therein, each aperture extending from the bottom portion of the respective groove and having its centerline in a plane including the axis of rotation of said blade shank relative to said socket and a radius of said respective groove, which radius extends from said axis to said respective groove, said centerline intersecting said radius at an acute angle.

4. A propeller blade mounting comprising relatively oscillatable groove-carrying members including a blade shank and a shank receiving hub, a set of substantially parallel bearing-element-receiving grooves in said blade shank arranged in planes transverse to the longitudinal axis of said blade shank, and a set of substantially parallel bearing-element-receiving grooves in said hub cooperating with the grooves in said blade to form with said bearing elements a blade-supporting bearing, bearing loading apertures through one of said members, each aperture intersecting a respective groove at a point spaced from one edge thereof a distance equal to a selected bearing length, and arranged with the longitudinal centerline of said aperture at an acute angle to the plane of its associated groove, the grooves in at least one of said members having edge portions conforming substantially to the shape of the bearing element but separated to provide an elongated groove to permit relative movement of said member and said element transverse to the planes of said elongated grooves, whereby said grooves may be loaded with bearing elements, and bearing surfaces, uninterrupted by loading holes, are provided.

JOHN E. ANDERSON.